US009435280B2

(12) United States Patent
Sanchez Gonzalez et al.

(10) Patent No.: US 9,435,280 B2
(45) Date of Patent: Sep. 6, 2016

(54) END OF MOTION DETECTION CIRCUIT FOR DIESEL ENGINES

(71) Applicant: Continental Automotive Systems, Inc., Auburn Hills, MI (US)

(72) Inventors: Izcoati Emmanuel Sanchez Gonzalez, Guadalajara (MX); Sergio Garcia de Alba Garcin, Guadalajara (MX); Oscar Alexjandro Camacho, Guadalajara (MX); Rafael Cobas Asensio, Guadalajara (MX)

(73) Assignee: Continental Automotive Systems, Inc., Auburn Hills, MI (US)

( * ) Notice: Subject to any disclaimer, the term of this patent is extended or adjusted under 35 U.S.C. 154(b) by 342 days.

(21) Appl. No.: 14/197,494

(22) Filed: Mar. 5, 2014

(65) Prior Publication Data

US 2015/0256114 A1 Sep. 10, 2015

(51) Int. Cl.

*H02P 6/06* (2006.01)
*F02D 41/20* (2006.01)
*F02M 51/06* (2006.01)
*F02M 65/00* (2006.01)

(52) U.S. Cl.

CPC .......... *F02D 41/20* (2013.01); *F02M 51/0617* (2013.01); *F02M 65/005* (2013.01); *F02D 2041/2041* (2013.01); *F02D 2041/2044* (2013.01); *F02D 2041/2079* (2013.01)

(58) Field of Classification Search

USPC ......... 318/400.06, 604, 400.03, 400.34, 459, 318/128, 718
See application file for complete search history.

(56) References Cited

U.S. PATENT DOCUMENTS

| | | | | | |
|---|---|---|---|---|---|
| 5,350,984 | A * | 9/1994 | Carobolante | H02P 6/20 | 318/139 |
| 5,494,219 | A | 2/1996 | Maley | | |
| 5,954,030 | A | 9/1999 | Sturman et al. | | |
| 6,247,450 | B1 | 6/2001 | Jiang | | |
| 9,091,709 | B2 * | 7/2015 | Bolz | G01R 19/30 | |
| 2004/0222779 | A1 * | 11/2004 | Cock | H02P 6/182 | 324/76.77 |
| 2006/0096560 | A1 | 5/2006 | Afjef et al. | | |
| 2007/0067127 | A1 * | 3/2007 | Bolz | F02D 41/20 | 702/94 |
| 2013/0234640 | A1 * | 9/2013 | Bateman | H02P 6/182 | 318/400.35 |

FOREIGN PATENT DOCUMENTS

DE 102005044886 B4 12/2009

* cited by examiner

*Primary Examiner* — Jorge L Carrasquillo

(57) ABSTRACT

A detection circuit for a diesel injection valve includes a first threshold, a first comparator for receiving a BEMF signal from the valve and compare the BEMF signal to the first threshold, a filter for filtering the BEMF signal thereby providing a filtered BEMF signal, a second threshold, and a second comparator for comparing a difference between the BEMF signal and the filtered BEMF signal to the second threshold, indicating an end of motion of the valve. An output of the first comparator and an output of the second comparator are joined to define an output signal. The output signal is activated only when the BEMF signal is above the first threshold and when the difference between the BEMF signal and the filtered BEMF signal is greater than the second threshold.

18 Claims, 2 Drawing Sheets

END OF MOTION DETECTION CIRCUIT FOR DIESEL ENGINES

FIELD

This invention relates to powertrain control for diesel engines and, more particularly, to a detection circuit for detecting end of motion of a valve in order to synchronize control pulses for the injection process.

BACKGROUND

In vehicles with diesel engines, it is important to synchronize control pulses for the injection process. Conventional mechanical and/or electrical systems for such synchronization have been developed, but these systems are costly and may not be accurate.

Thus, there is a need to provide a detection circuit for detecting end of motion of a valve in a diesel engine in order to synchronize control pulses for the injection process in a more accurate and less costly manner.

SUMMARY

An objective of the invention is to fulfill the need referred to above. In accordance with the principles of an embodiment, this objective is achieved by a detection circuit for detecting end of motion of a diesel injection valve. The valve has a first coil for opening the valve and a second coil for closing the valve. The detection circuit includes a first threshold, a first comparator constructed and arranged to receive a back electromotive feedback (BEMF) signal from the valve and compare the BEMF signal to the first threshold, a filter constructed and arranged to filter the BEMF signal thereby providing a filtered BEMF signal, a second threshold, and a second comparator constructed and arranged to compare a difference between the BEMF signal and the filtered BEMF signal to the second threshold, indicating an end of motion of the valve. An output of the first comparator and an output of the second comparator are joined to define an output signal. The output signal is activated only when the BEMF signal is above the first threshold and when the difference between the BEMF signal and the filtered BEMF signal is greater than the second threshold.

In accordance with another aspect of an embodiment, a method synchronizes output signals from an engine control unit (ECU) to a diesel injection valve. The valve has a first coil for opening the valve and a second coil for closing the valve. The method compares a BEMF signal received from the valve to a first threshold, thereby defining a first output. The BEMF signal is filtered thereby providing a filtered BEMF signal. An end of motion of the valve is detected by comparing a difference between the BEMF signal and the filtered BEMF signal to a second threshold, thereby defining a second output. The first output is joined with the second output to define an output signal. The output signal is activated only when the BEMF signal is above the first threshold and when the difference between the BEMF signal and the filtered BEMF signal is greater than the second threshold. The activated output signal is received at the ECU. Control signals sent by the ECU to the valve are synchronized based on end of motion of the valve.

Other objectives, features and characteristics of the present invention, as well as the methods of operation and the functions of the related elements of the structure, the combination of parts and economics of manufacture will become more apparent upon consideration of the following detailed description and appended claims with reference to the accompanying drawings, all of which form a part of this specification.

BRIEF DESCRIPTION OF THE DRAWINGS

The invention will be better understood from the following detailed description of the preferred embodiments thereof, taken in conjunction with the accompanying drawings, wherein like reference numerals refer to like parts, in which.

DETAILED DESCRIPTION OF EXEMPLARY EMBODIMENTS

Figure 2:
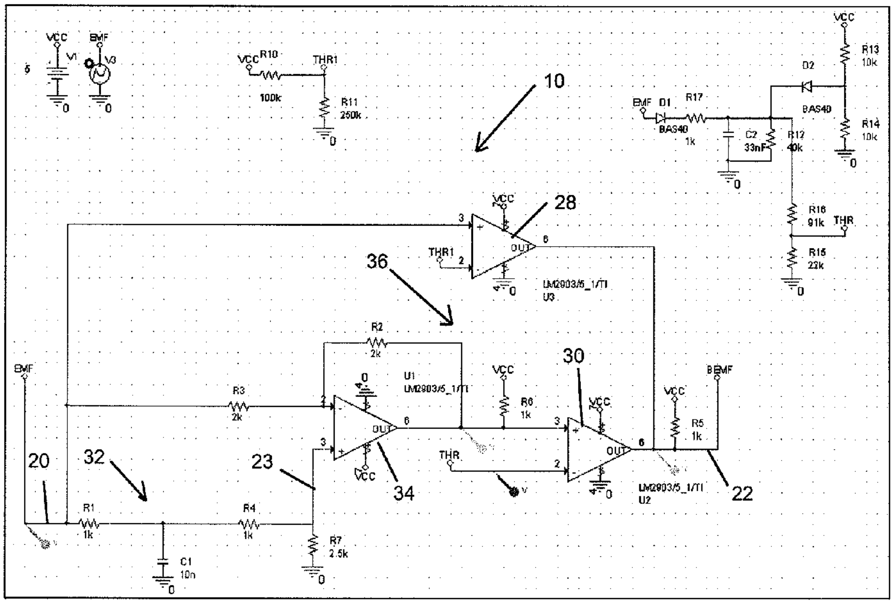
FIG. 2 is a detailed schematic of the detection circuit of FIG. 1.

With reference to FIG. 2, a detection circuit, generally indicated at 10, detects the end of motion of a valve 12 that regulates the injection of oil, which in turn injects diesel to the cylinders of a diesel engine (not shown) via a piston driven by the oil. The valve 12 is driven by a dual coil system. A first coil 14 opens the valve 12 while a second coil 16 closes the valve 12. When one of the coils 14, 16 has a current driven through it, this coil induces a current in the opposite coil due to the leakage of magnetic flux. The detection circuit 10 detects this induced current/voltage and using the sudden change of slope at the end of the back electromotive feedback (BEMF) signal 20 (which signifies that the valve 12 has reached the end of its motion) the circuit 10 gives a pulse at the exact moment the valve 12 reaches the end of its motion.

The sudden change of slope is detected by the "delta" difference of a moving average of the BEMF signal 20, and the BEMF signal 20 itself. In other words, the BEMF signal 20 is subtracted from a moving average of the filtered BEMF signal 23 to produce a delta voltage. Since the filtered BEMF signal 23 has a slight lag from the original BEMF signal 20 due to filtering, when the slope suddenly changes the delta increases significantly. When the delta is greater than a given threshold, the change of slope is detected and thus the end of motion of valve 12 is detected. With this pulse, the engine control unit (ECU) 18 is able to synchronize the control pulses of the valve 12 for the injection process more accurately and at a lower cost than conventional systems.

Figure 1:
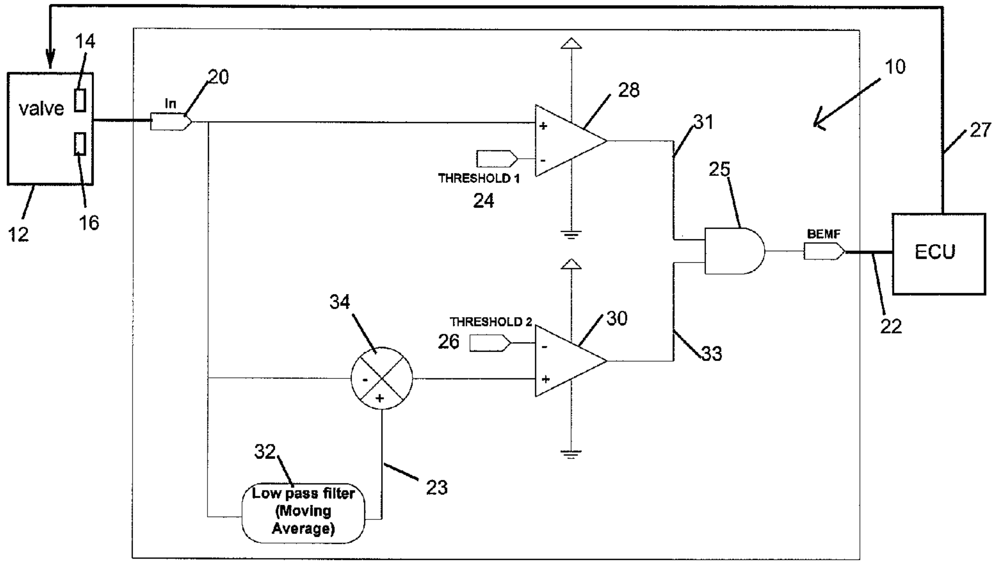
FIG. 1 is a block diagram of a detection circuit, associated with a valve and ECU of a diesel engine, provided in accordance with an embodiment.

A block diagram of the detection circuit 10 is shown in FIG. 1. The BEMF signal 20 has to fulfill two conditions for the output signal 22 to activate. First, the BEMF signal 20 has to be above a first threshold 24 and second, the sudden change in the slope (the difference in values of filtered BEMF signal 23 and BEMF signal 20) has to be above that of a second threshold 26. A first comparator 28 checks the first condition, while a second comparator 30 checks the second condition. The BEMF signal 20 is filtered with a low pass filter 32 and the original BEMF signal 20 is subtracted from the "lagged" filtered BEMF signal 23. The difference in signals is determined from comparator 34 and is then compared against the second threshold 26 at comparator 30. If the BEMF signal 20 fulfills both conditions, the output signal 22 from AND gate 25 is activated and the ECU 18 synchronizes, via feedback signal 27, the control pulses of the valve 12 for the injection process.

Figure 3:
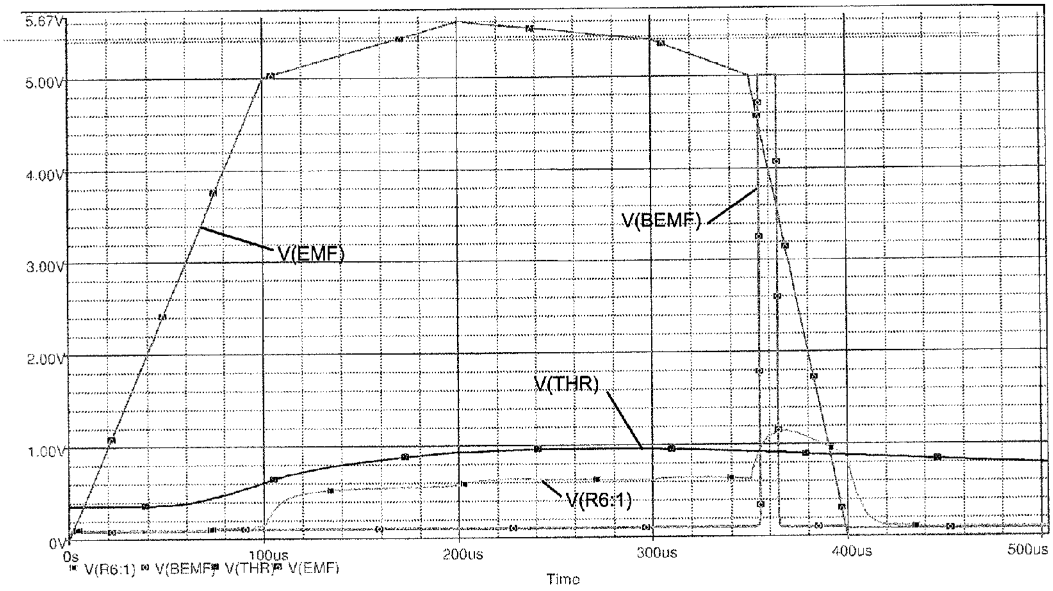
FIG. 3 is graph showing the results of a simulation of the detection circuit of FIG. 2.

FIG. 3 shows a detailed schematic of the detection circuit 10 of FIG. 2. The circuit 10 includes three operational amplifiers 28, 30, 34, the passive low pass filter 32, and an adaptive threshold circuit, generally indicated at 36. The low pass filter 32 is an RC arrangement having resistor R1 and capacitor C1. The operational amplifier 28 checks the first condition: that the voltage level of the BEMF signal 20 must be above, for example, at least 3.6V. The operational amplifier 34 is configured for subtraction; it subtracts the moving average of the signal from the signal itself. The difference result is compared against a given threshold by the operational amplifier 30. The first output 31 of operational amplifier 28 and the second output 33 of operational amplifier the 30 share the same net output (define output signal 22). This creates an implicit AND gate since both amplifiers 28, 30 are of the open collector type. The output signal 22 is activated if the described conditions are met. It can be appreciated that at least one of the operational amplifiers can be replaced with a MOSFET.

With reference to FIG. 3, plot results are shown of a simulation ran on pSpice® of the detection circuit 10 of FIG. 2. V(R6:1) is the subtraction of the BEMF signal 20 minus its moving average. V(BBEMF) is the output signal 22, notice that it generates a pulse with the sudden change of slope at the end of the BEMF signal 20. V(BEMF) is the original BEMF signal 20 multiplied by a gain factor. V(THR) is the threshold 26 (which is adapted depending on the amplitude of the BEMF signal 20).

Thus, the detection circuit and method is used to synchronize the control pulses for the injection process of valve 12. It is based on information extracted from the back BEMF of the injection valve 12. This circuit 10 has a simple, yet very efficient logic that enables accurate and low cost injection synchronization.

The foregoing preferred embodiments have been shown and described for the purposes of illustrating the structural and functional principles of the present invention, as well as illustrating the methods of employing the preferred embodiments and are subject to change without departing from such principles. Therefore, this invention includes all modifications encompassed within the scope of the following claims.

What is claimed is:

1. A detection circuit for detecting end of motion of a diesel injection valve, the valve having a first coil for opening the valve and a second coil for closing the valve, the detection circuit comprising:

a first threshold, a first comparator constructed and arranged to receive a back electromotive feedback (BEMF) signal from the valve and compare the BEMF signal to the first threshold, a filter constructed and arranged to filter the BEMF signal thereby providing a filtered BEMF signal, a second threshold, a second comparator constructed and arranged to compare a difference between the BEMF signal and the filtered BEMF signal to the second threshold, indicating an end of motion of the valve, wherein an output of the first comparator and an output of the second comparator are joined to define an output signal and wherein, the output signal is activated only when the BEMF signal is above the first threshold and when the difference between the BEMF signal and the filtered BEMF signal is greater than the second threshold, and a third comparator constructed and arranged to subtract the BEMF signal from a moving average of the filtered BEMF signal, thereby defining said difference.

2. The circuit of claim 1, wherein the filter is a low pass filter.

3. The circuit of claim 2, wherein the low pass filter comprises a capacitor and a resistor.

4. The circuit of claim 1, wherein the first threshold is voltage.

5. The circuit of claim 4, wherein the voltage is at least 3.6 volts.

6. The circuit of claim 1, wherein each of the first, second and third comparators is an operational amplifier.

7. The circuit of claim 6, wherein each of the first and second operational amplifiers is an open collector operational amplifier.

8. The circuit of claim 1, wherein at least one of the comparators is a MOSFET.

9. The circuit of claim 1 in combination with the valve and an engine control unit (ECU), wherein the ECU receives the activated output signal so as to synchronize control signals to the valve based on end of motion of the valve.

10. A method of synchronizing output signals from an engine control unit (ECU) to a diesel injection valve, the valve having a first coil for opening the valve and a second coil for closing the valve, the method comprising:

comparing a back electromotive feedback (BEMF) signal received from the valve to a first threshold, thereby defining a first output, filtering the BEMF signal thereby providing a filtered BEMF signal, detecting an end of motion of the valve by comparing a difference between the BEMF signal and the filtered BEMF signal to a second threshold, thereby defining a second output, joining the first output with the second output to define an output signal, activating the output signal only when the BEMF signal is above the first threshold and when the difference between the BEMF signal and the filtered BEMF signal is greater than the second threshold, receiving activated output signal at the ECU, synchronizing control signals sent by the ECU to the valve based on end of motion of the valve, wherein the detecting step includes subtracting the BEMF signal from a moving average of the filtered BEMF signal, thereby defining said difference.

11. The method of claim 10, wherein the step of filtering uses a low pass filter.

12. The method of claim 11, wherein the low pass filter comprises a capacitor and a resistor.

13. The method of claim 10, wherein the first threshold is voltage.

14. The method of claim 13, wherein the voltage is at least 3.6 volts.

15. The method of claim 10, wherein each of the comparing steps and the subtracting step includes using an operational amplifier.

16. The method of claim 10, wherein at least one of the comparing steps uses a MOSFET.

17. The method of claim 10, wherein each of the comparing steps and the subtracting step includes using an operational amplifier.

18. A method of detecting end of motion of a diesel injection valve, the valve having a first coil for opening the valve and a second coil for closing the valve, the method comprising:

comparing an back electromotive feedback (BEMF) signal received from the valve to a first threshold, thereby defining a first output, filtering the BEMF signal thereby providing a filtered BEMF signal, detecting an end of motion of the valve by comparing a difference between the BEMF signal and the filtered BEMF signal to a second threshold, thereby defining a second output, joining the first output with the second output to define an output signal, and activating the output signal only when the BEMF signal is above the first threshold and when the difference between the BEMF signal and the filtered BEMF signal is greater than the second threshold, wherein the detecting step includes subtracting the BEMF signal from a moving average of the filtered BEMF signal, thereby defining said difference.

* * * * *